June 3, 1924.  
H. I. SMITH  
1,496,682

DEMOUNTABLE RIM

Filed Feb. 15, 1921  2 Sheets-Sheet 1

Inventor  
H. I. Smith,  
By  
Geo. F. Kimmel  
Attorney

June 3, 1924.
H. I. SMITH
DEMOUNTABLE RIM
Filed Feb. 15, 1921
1,496,682
2 Sheets-Sheet 2
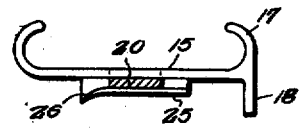
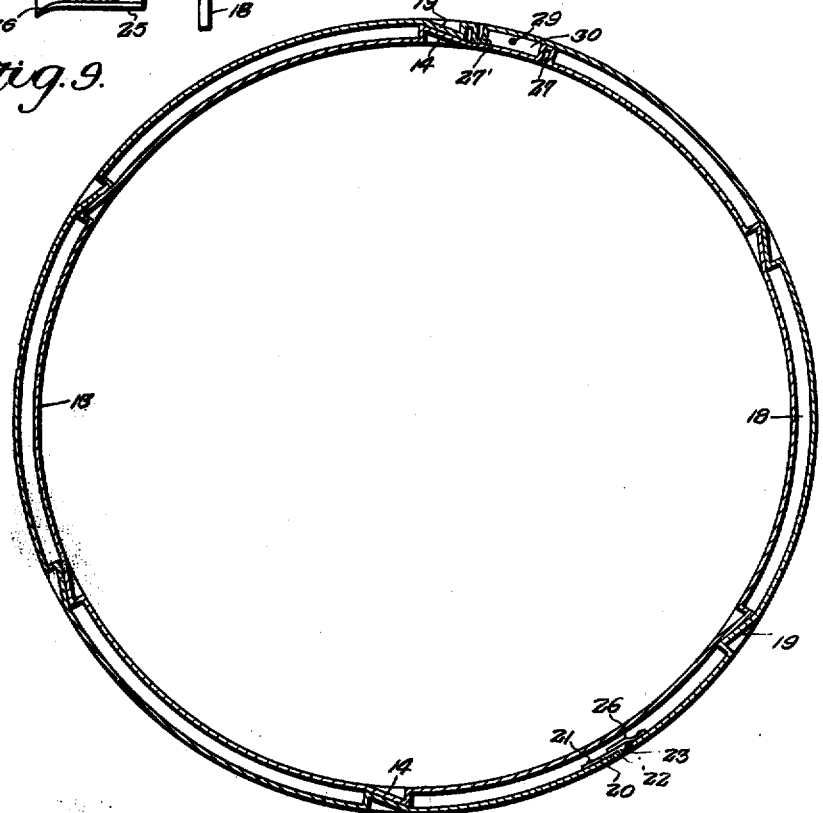
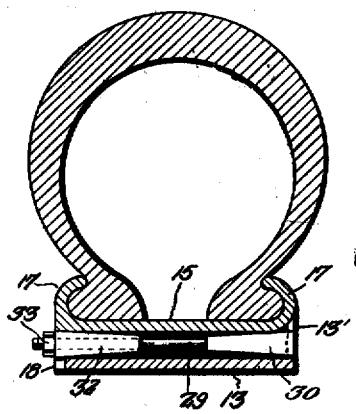
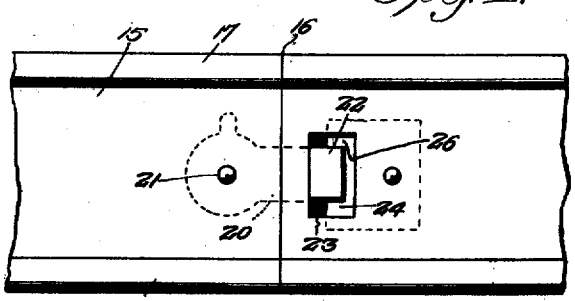
Inventor
H. I. Smith,
By Geo. P. Kimmel, Attorney Patented June 3, 1924.

1,496,682

UNITED STATES PATENT OFFICE.

HARRY I. SMITH, OF GLEZEN, INDIANA, ASSIGNOR OF ONE-EIGHTH TO FRANK P. GOEBEL, ONE-EIGHTH TO CHARLES P. BORDERS, ONE-EIGHTH TO LEWIS W. BURRIS, AND ONE-EIGHTH TO HARRY CLEMENTS, ALL OF WASHINGTON, INDIANA.

DEMOUNTABLE RIM.

Application filed February 15, 1921. Serial No. 445,176.

*To all whom it may concern:*

Be it known that I, HARRY I. SMITH, a citizen of the United States, residing at Glezen, in the county of Pike and State of Indiana, have invented certain new and useful Improvements in Demountable Rims, of which the following is a specification.

The invention relates to improvements in demountable rims for vehicle wheels and more especially to the type of the same adapted for use on automobile wheels, whereby to facilitate the quick removal and replacement of a tire thereon.

The invention has for its primary object to provide for a split rim construction, whereby the tire may be readily and easily applied to or detached from the rim.

Another object of the invention is to provide for a novel means for interlocking the rim with the felly of the wheel, whereby to prevent accidental lateral displacement of the rim and tire from the position thereon.

A further object of the invention is to combine with the other enumerated features thereof, a means for preventing accidental circumferential movement of the rim while in interlocking engagement with the felly of the wheel.

With the foregoing and other objects in view, the invention resides in the certain novel and useful construction and arrangement of parts as will be hereinafter more fully described, set forth in the appended claim, and illustrated in the accompanying drawings, in which:—

Fig. 2 is a sectional view thereof with the tire removed,

Fig. 3 is a transverse section through the tire illustrating the wedge device employed to prevent circumferential movement of the rim when the latter is interlocked with the felly.

Figure 1:
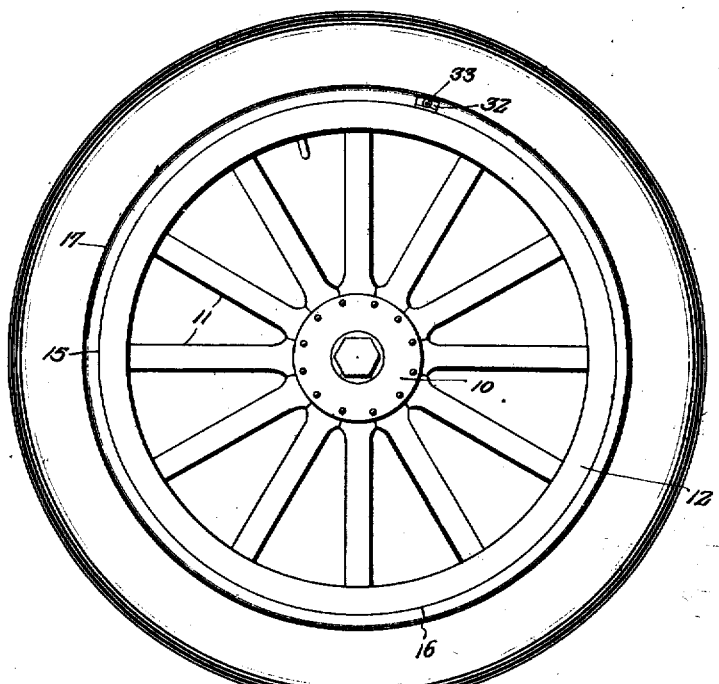
Fig. 1 is a side elevation of a wheel embodying the invention.
Figure 5:
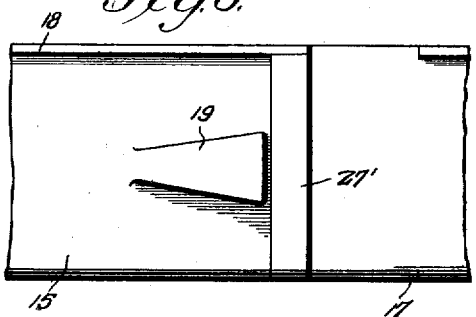
Figure 7:
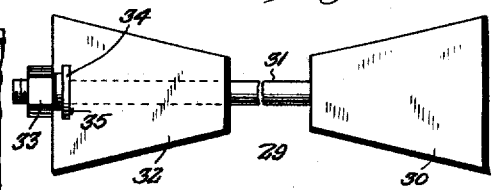
Figure 6:
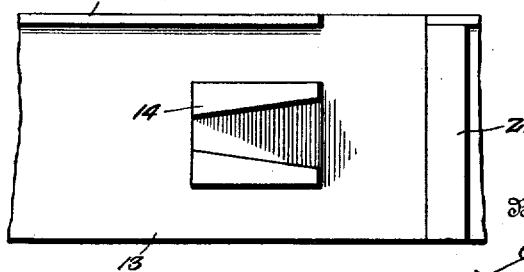
Figure 8:
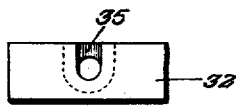

Fig. 4 is a fragmentary detail in plan of the split ends of the rim and showing the locking means for securing the adjacent ends in abutting relations, Fig. 5 is a fragmentary detail in plan of the rim of the wheel showing one of the interlocking wedges thereon, Fig. 6 is a fragmentary detail in plan of the face of the felly band, showing one of the wedge-slotted members thereof adapted for interlocking engagement with the wedge of the rim, Fig. 7 is a plan view of the locking wedge member for preventing the circumferential movement of the rim on the felly, Fig. 8 is a detail in elevation of the removable wedge element as in Fig. 7, and, Fig. 9 is a view of that end of the rim on which is secured the guide plate for directing the movement of the locking lever adapted to connect adjacent ends of the rim together.

Referring to the drawings, wherein similar characters of reference designate corresponding parts in the several views thereon, the numeral 10 indicates the hub portion of a wheel and 11 the spokes extending radially outwardly therefrom. Carried on the ends of the spokes 11 is a felly 12 and a felly band 13 surrounding the same, the latter being generally of usual form, but is preferably formed with a series of equi-distantly spaced substantially wedge-slotted fastenings or lugs 14, these lugs 14 being similarly disposed in one direction circumferentially and medially of the upper face of the felly band.

The rim 15 is preferably of one piece construction, split transversely at one point of its circumference as at 16, and has its opposite edges provided with upstanding tire fixing flanges 17, and a depending flange 18, which is disposed in abutting relation against the side of the felly band 13 opposite to the flange 13' formed with the latter. Spaced equi-distantly around the under face of the rim 15 are a number of wedge-fastening members 19 corresponding in number and complemental one to each of the slotted lugs 14, and the same are adapted for a locking engagement therewith when the rim is sprung or slid into position on the felly band 13 and turned thereon in the proper direction for such purpose.

For securing the abutting or adjacent ends of the rim 15 together, a locking lever 20 is provided, and the same is pivoted, as at 21, inward of one end therefrom, and the same is of a length to have its free end project into overlapping relation with the under face of the adjacent end of the rim, which projected end is provided with a locking lug 22, adapted for interlocking engagement with a transversely elongated recess or slot 23, when the rim 15 has been properly positioned on the felly band 13 and has its wedge slots 19 engaged with the wedge lugs 14. The lever 20 is preferably of spring metal, and the same is actuated to and from opposite positions by means of a projection 24 formed radially of the circular pivoted portion thereof, the free end of the same, on which the lug 22 is carried, being movable transversely of the rim 15 in a cam guideway 25 formed on the opposed edge of the plate 26, which is secured in position on the under side of the end of the rim opposite the end on which the lever is pivoted, the grooved edge of the plate 26 being arranged to underlie the slot 23. This cam guideway 25 of the plate 26 is curved downwardly at one side of the rim 15, so that the lug 22 of the lever 20 is free to pass under the lower face of the latter in its movement to and from engagement with the recess or slot 23, and by reason of the resiliency of the lever 20, the lug 22 is held tensioned within the recess or slot 23 when moved into engagement therewith.

For the purpose of preventing accidental circumferential movement of the rim 15, the felly band 13 is formed with an outwardly disposed transversely extending rib 27 normally in spaced relation with respect to a similarly transverse rib 27' formed on the under face of the rim 15, so as to provide a transversely extending guideway for the reception of a wedge member 28, whereby to prevent such movement, when the parts are assembled, and which acts to force the rim in a direction to cause wedges 14 and 19 to remain firmly engaged. For the insertion of the wedge member 28 into position, the flange 18 of the rim 15 is recessed, as at 29, to register with the guideway of the portions 27 and 27' on the felly band 13 and the rim 15, and the member consists of a head wedge 30 having a threaded shank 31 projecting from the smaller end thereof, and which is adapted to receive a removable wedge member 32, after the wedge 30 and the shank 31 have been inserted through the guideway 27, and which is secured in position by means of a nut 33. The wedge 32 is preferably movable into and out of the guideway 27 with the fastening and unfastening movement of the nut 33, and for this purpose the latter is provided with an annular flange portion 34 which is arranged in turning engagement in a slot 35 formed downward in the outer end portion of the wedge member 32, as shown in Figs. 7 and 8, the flange 34 of the nut 33 being engaged in the slot 35 of the removable wedge member 32 prior to the positioning of the same on the threaded shank 31 of the other wedge member 30.

In the assembling of the wheel in accordance with the invention, the felly band 13 having been secured on the felly 12 in any usual or suitable manner, the ends of the rim are secured together, after the tire has been engaged between the clincher flanges 17 thereof, by means of the lever 20 being manipulated to bring the lug 22 into engagement with the recess 23. The rim 15 is now slipped onto the felly band 13 from the unflanged side of the latter, the wedges 19 of the rim 15 passing immediately between the wedges 14 of the felly. When the rim 15 is fully positioned on the felly band 13, it is moved circumferentially so as to move the wedges 19 into engagement with the wedges 14, afterwards the wedge 30 is passed into the guideway between the members 27 and 27' from one side of the wheel, and the wedge 32, with the coupled nut 33 is then threaded onto the end of the projecting end of the shank 31 at the opposite side of the wheel, and as the nut is screwed up to tightened position, the wedges 30 and 32 are forced toward each other, and act against the members 27 and 27' to move the rim circumferentially, so that the wedges 14 and 19 are firmly engaged, and the wheel is then ready for use. When it is necessary to remove a tire for repairs or replacement, the wedges 30 and 32 are separated and removed, as the nut 33 is unscrewed the wedge 32 is withdrawn from the channel or guideway between the members 27 and 27', and the rim 15 is then turned circumferentially on the felly band 13 until the wedges 14 and 19 are disengaged, when the rim 15 may be slipped laterally from the wheel. The rim ends may be now released by properly manipulating the lever 20 laterally of the rim 15 until the lug 22 is free from the slot 23, so that the tire can be readily removed from the clincher flanges 17 of the rim.

It is to be fully understood that various changes in the detailed construction and arrangement of parts may be resorted to without departing from the spirit and scope of the invention.

Having thus fully described my invention, what is claimed, is:—

In a vehicle wheel structure, a felly band having an outwardly extending flange at its inner side and further having its body portion offset centrally to form a series of spaced pairs of outwardly projecting opposed wedge-shaped portions, the portions of each pair being oppositely disposed thereby providing a wedge-shaped slot extending circumferentially with respect to the body portion of the band, a tire supporting rim provided with an inwardly extending flange at its outer side and further having the body portion thereof inset centrally to form a series of spaced wedge-shaped fasteners engaging in said slots for interlocking the band and rim together, said flanges abutting against the rim and band, said band and rim offset radially to provide a pair of spaced oppositely extending ribs abutting against the rim and band and providing a transverse guide passage, said flanges having openings for access to each end of said passage, oppositely disposed transversely extending spaced shiftable wedge elements mounted in said passage, and means extending through and connected with one of said elements and further secured to the other of said elements and adapted when operated to shift said elements to secure the band and rim together to prevent circumferential movement of one relative to the other, the openings in said flanges forming clearances for the operation of said elements.

In testimony whereof, I affix my signature hereto.

HARRY I. SMITH.